United States Patent [19]

Maenaka et al.

[11] Patent Number: 5,555,023
[45] Date of Patent: Sep. 10, 1996

[54] SIGNAL PROCESSING CIRCUIT FOR VIDEO CAMERA WHICH PREVENTS A FALSE APERTURE SIGNAL FROM BEING GENERATED

[75] Inventors: Akihiro Maenaka, Moriguchi; Yukio Mori, Yawata; Haruhiko Murata, Takatsuki; Hirokazu Ide, Osaka; Hidefumi Okada, Daito, all of Japan

[73] Assignee: Sanyo Electric Co., Ltd., Osaka, Japan

[21] Appl. No.: 429,295

[22] Filed: Apr. 25, 1995

[30] Foreign Application Priority Data

Apr. 26, 1994 [JP] Japan .................................. 6-088502

[51] Int. Cl.⁶ .............................................. H04N 9/68
[52] U.S. Cl. ................................... 348/253; 348/273
[58] Field of Search ................................. 348/222, 234, 348/252, 253, 266, 272, 625, 630, 273; H04N 5/228, 9/68, 5/208, 9/64

[56] References Cited

U.S. PATENT DOCUMENTS 5,325,182   6/1994   Murata .................................. 348/663
5,333,055   7/1994   Murata .................................. 348/273

*Primary Examiner*—Safet Metjahic
*Assistant Examiner*—Sherrie Hsia
*Attorney, Agent, or Firm*—Nikaido Marmelstein Murray & Oram LLP

[57] ABSTRACT

A signal processing circuit is utilized in a video camera which includes a CCD having pixels arranged in a dot-matrix fashion and color filters of R, G and B arranged in a mosaic fashion, and an output signal from the CCD is converted into a digital signal. A horizontal aperture signal (Hap) and a vertical aperture signal (Vap), which are produced on the basis of the digital signal, are multiplied by coefficients (K1, K2) which are obtained on the basis of a horizontal correlation value (Sh) and a vertical correlation value (Sv), and then, added to each other in an adding circuit, whereby an aperture signal is obtained by the adding circuit. The aperture signal is added to a luminance signal to perform an image enhancement.

8 Claims, 9 Drawing Sheets

FIG.3

| D11 | D12 | D13 |
|-----|-----|-----|
| D21 | D22 | D23 |
| D31 | D32 | D33 |

FIG.6(A) PRIOR ART HD
FIG.6(B) PRIOR ART OUTPUT OF 1H DELAY 17 
FIG.6(C) PRIOR ART OUTPUT OF 1H DELAY 16 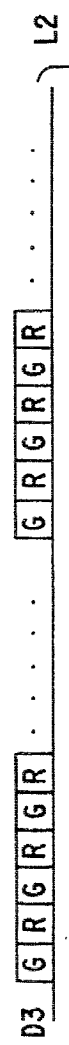
FIG.6(D) PRIOR ART OUTPUT OF A/D CONVERTER 15 
FIG.6(E) PRIOR ART OUTPUT OF A/D CONVERTER 14 
FIG.6(F) PRIOR ART FIELD ID SIGNAL

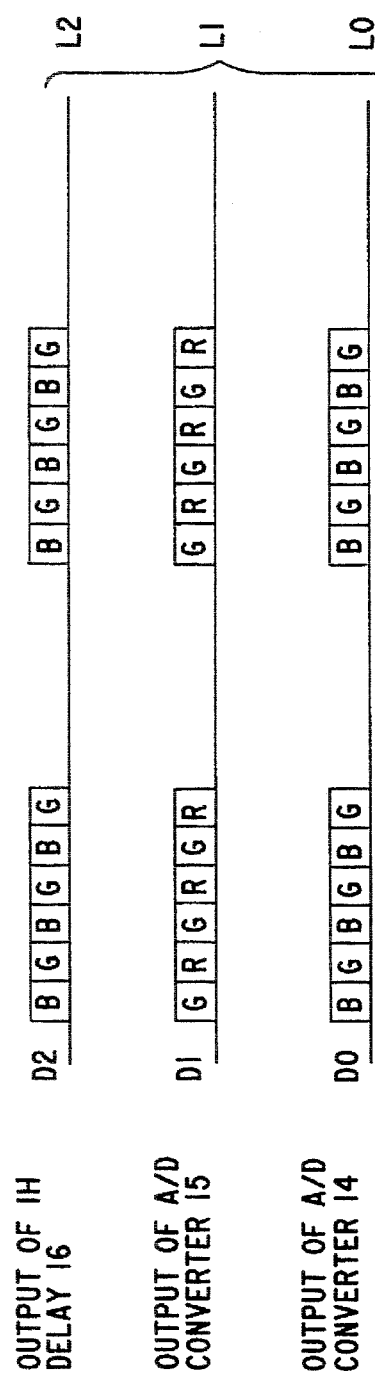
FIG.7(A) PRIOR ART HD
FIG.7(B) PRIOR ART OUTPUT OF IH DELAY 17
FIG.7(C) PRIOR ART OUTPUT OF IH DELAY 16
FIG.7(D) PRIOR ART OUTPUT OF A/D CONVERTER 15
FIG.7(E) PRIOR ART OUTPUT OF A/D CONVERTER 14
FIG.7(F) PRIOR ART FIELD ID SIGNAL

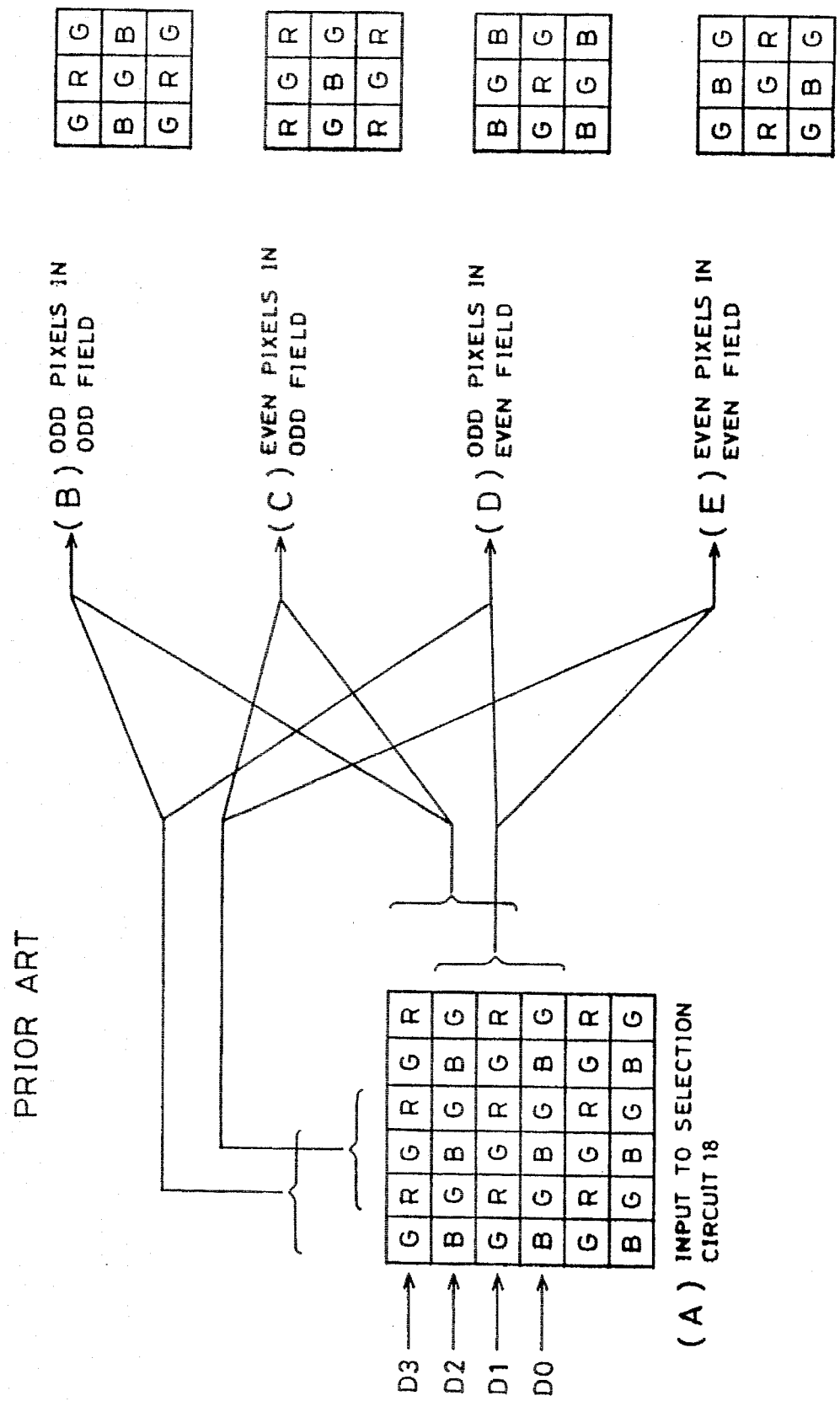

FIG. 9 PRIOR ART
(A) ODD PIXELS
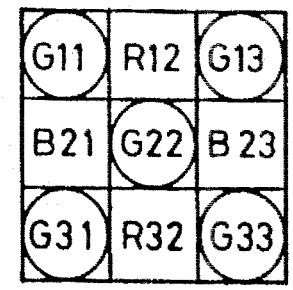
(B) EVEN PIXELS
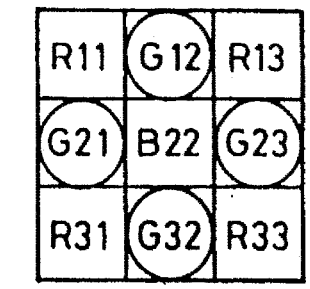

5,555,023

SIGNAL PROCESSING CIRCUIT FOR VIDEO CAMERA WHICH PREVENTS A FALSE APERTURE SIGNAL FROM BEING GENERATED

BACKGROUND OF THE INVENTION

1. Field of the Invention

The present invention relates to a signal processing circuit for video camera. More specifically, the present invention relates to a signal processing circuit which performs an image enhancement in a horizontal direction and/or a vertical direction in a video camera which utilizes a solid-state image sensing device having a large number of pixels arranged in a matrix fashion and a plurality of color filters having spectral sensitivity characteristics different from each other and being arranged for the pixels in a mosaic fashion.

2. Description of the Prior Art

In a color video camera utilizing such a kind of solid-state image sensing device, in corresponding to each of the pixels of the solid-state image sensing device, there is provided with a color filter having a specific color, i.e. one of three colors R, G and B, for example. Then, a luminance signal Y and color signals R, G and B are produced through a color separation performed by processing a signal from each of the pixels of the solid-state image sensing device corresponding to the specific color.

On the other hand, in the video camera, image enhancements in the horizontal direction and the vertical direction are performed by producing aperture signals (image enhancing signals) and by adding the aperture signals to the luminance signal Y.

In FIG. 4, a signal processing circuit for video camera having a prior art image enhancement function is shown. A CCD 1 is constructed by an image sensing portion 2 and a horizontal transfer portion 3. The CCD 1 is shown in FIG. 5 in detail. More specifically, photo-diodes 4, 4, . . . each performing a photoelectric conversion are provided with color filters of a mosaic arrangement as shown in FIG. 5. Then, the image sensing portion 2 includes such the photo-diodes 4 and vertical transfer CCDs 5, 5, . . . . each of which is driven by a 6-phase pulse from a vertical driving circuit 6. The horizontal transfer portion 3 includes dual-channel structure of first and second horizontal transfer CCDs 7 and 8 which are simultaneously driven by a horizontal driving circuit 9 in two phases so as to perform a double-speed reading, whereby signals of two horizontal lines can be obtained simultaneously.

In addition, an image sensing device including the above described CCD has been filed by the same assignee as that of the present invention as Japanese Patent Application Laying-open No. 6-225195 laid-open on Aug. 12, 1993, and therefore, a detailed description of the CCD will be omitted here.

The signals from the horizontal transfer portion 3, that is, from the first and second horizontal transfer CCDs 7 and 8 are processed by CDS (Correlation Double Sampling) circuits 10 and 11 and AGC (Automatic Gain Control) circuits 12 and 13, and then, converted into digital signals by A/D converter circuits 14 and 15.

The output signals from the CCD 1 which are converted into digital signals are applied to a selection circuit 18 directly or via 1H delay circuits 16 and 17. Each of the 1H delay circuits 16 and 17 includes a memory capable of storing the digital signal for one horizontal period (1H) of the CCD 1, and a digital signal being delayed by 1H is outputted from the memory. In addition, writing and reading to and from the 1H delay circuits 16 and 17 are performed in synchronous with the horizontal transfer in the solid-state image sensing device 1. Therefore, a timing generator 30 and a synchronization signal generator 31 are provided. The timing generator 30 outputs a clock signal which is applied to the horizontal driving circuit 9 (see FIGS. 6(A)–6(F)) and the 1H delay circuits 16 and 17. The synchronization signal generator 31 also receives the clock signal from the timing generator 30 so as to operate in synchronous with the timing generator 30, and outputs a horizontal synchronization signal HD (FIG. 6(A) or 7(A)), a vertical synchronization signal VD, the clock signal, and a field identification (ID) signal representative of an odd field or an even field.

The selection circuit 18 includes selectors 19, 20 and 21 which select digital signals for three lines out of signals for four lines according to an odd field or an even field. That is, the selectors 19, 20 and 21 are controlled based upon the field ID signal indicative of the odd field or the even field. Then, in the odd field, signals D0, D1, and D2 are selected, and in the even field, signals D1, D2 and D3 are selected. Therefore, from the selection circuit 18, signals L0, L1 and L2 for the three lines according to the odd field or the even field can be obtained.

More specifically, when the field ID signal indicates the odd field, that is, when the field ID signal is the low level (FIG. 6(F)), the selector 19 selects the digital signal D1, the selector 20 selects the digital signal D2, and the selector 21 selects the digital signal D3. That is, since the field ID signal is the low level as shown in FIG. 6(F), the selection circuit 18 outputs the digital signals D1, D2 and D3 shown in FIG. 6(D), FIG. 6(C), FIG. 6(B) as the output signals L0, L1 and L2 and digital signal D0 (FIG. 6E) is not output.

When the field ID signal indicates the even field, that is, when the field ID signal is the high level (FIG. 7(F)), the selector 19 selects the digital signal D0, the selector 20 selects the digital signal D1, and the selector 21 selects the digital signal D2. That is, at the even field, since the field ID signal becomes the high level as shown in FIG. 7(F), the selection circuit 18 outputs the digital signals D0, D1 and D2 shown in FIG. 7(E), FIG. 7(D) and FIG. 7(C) as the output signals L0, L1 and L2 abd digital signal D3 (FIG. 7(B)) is not output.

FIG. 8(A) is an illustrative view showing a relationship between an arrangement of the pixels on the CCD 1 and pixels being selected. As described above, in the odd field, the line signals D1, D2 and D3 are selected, and therefore, at odd pixels in the odd field, pixels to be processed become as shown in FIG. 8(B). Furthermore, at even pixels in the odd field, pixels to be processed become as shown in FIG. 8(C). On the other hand, in the even field, since the line signals D0, D1 and D2 are selected, at odd pixels in the even field, pixels to be processed become as shown in FIG. 8(D), and at even pixels in the even field, pixels to be processed become as shown in FIG. 8(E).

The signals L0, L1 and L2 from the selection circuit 18 are supplied to a horizontal aperture signal producing circuit 22 which is constructed by a vertical LPF (low-pass filter) and a horizontal BPF (band-pass filter) each being a digital filter, and a vertical aperture signal producing circuit 23 which is constructed by a horizontal LPF and a vertical BPF each being a digital filter. In the both aperture signal producing circuits 22 and 23, arithmetic operations shown by the following equations (1), (2), (3) and (4) are performed on the basis of the signals of the pixels shown in FIG. 9.

$$Hap=-(G11+G31)+2(2\times G22)-(G13+G33) \quad (1)$$

$$Vap=-(G11+G13)+2(2\times G22)-(G31+G33) \quad (2)$$

$$Hap=-2\times G21+2(G12+G32)-2\times G23 \quad (3)$$

$$Vap=-2\times G21+2(G21+G23)-2\times G32 \quad (4)$$

Through such the arithmetic operations, aperture signals are produced for a center pixel of nine pixels shown in FIG. 9. Furthermore, only the pixels of G occupying a half of the pixels are utilized in performing the arithmetic operations to produce the aperture signals.

In addition, a numeral of an upper digit of a suffix after each of letters R, G and B indicative of the colors indicates a position in the vertical direction, and a numeral of a lower digit indicates a position in the horizontal direction.

As to the odd pixels in the odd field, a horizontal aperture signal Hap and a vertical aperture signal Vap are respectively calculated according to the equations (1) and (2) on the basis of five G pixels shown in FIG. 9(A). Furthermore, as to the even pixels in the odd field, a horizontal aperture signal Hap and a vertical aperture signal Vap are respectively calculated according to the equations (3) and (4) on the basis of four G pixels shown in FIG. 9(B). In addition, a horizontal aperture signal Hap and a vertical aperture signal Vap are respectively calculated according to the equations (1) and (2) for the even pixels in the even field, and according to the equations (3) and (4) for the odd pixels in the even field.

Then, the horizontal aperture signal Hap and the vertical aperture signal Vap are added to each other by an adding circuit 24, and then, supplied to an aperture signal addition circuit 25 in which an aperture signal from the adding circuit 24 is added to the luminance signal Y after a YC separation.

In the above described prior art, since the pixels of G signals are arranged in a zig-zag fashion, a signal of a pixel in which no G signal originally exists out of the pixels necessary for the arithmetic operation of the aperture signal is to be evaluated through an interpolation. Therefore, in a case where a vertically-striped image in which a shade exists in the horizontal direction and a correlation in the vertical direction is large is taken by the video camera, for example, originally, it is preferable that only the horizontal aperture signal Hap is generated, and the vertical aperture signal Vap becomes zero; however, a vertical aperture signal is undesirably generated, and thus, there was a possibility that an image quantity is deteriorated because the aperture signal is added to a portion that no change in the luminance occurs. Especially, if an aperture signal having a high-frequency is to be produced, unevenness of the luminance in a high-frequency region occurs. Therefore, in the prior art, a high-frequency region of the aperture signal is restricted, and therefore, it was impossible to increase a sharpness of an image sufficiently.

SUMMARY OF THE INVENTION

Therefore, a principal object of the present invention is to provide a novel signal processing circuit for video camera.

Another object of the present invention is to provide a signal processing circuit for video camera in which it is unnecessary to restrict a high-frequency region of an aperture signal, and therefore, an image quantity having a high-sharpness can be obtained.

A signal processing circuit according to the present invention is utilized in a video camera which comprises a solid-state image sensing device including a large number of pixels arranged in a matrix fashion, and a plurality of kinds of color filters having spectral sensitivity characteristics different from each other arranged in a mosaic fashion, said circuit comprising: an aperture signal producing circuit which outputs an aperture signal for performing an image enhancement in at least one of a horizontal direction and a vertical direction; a correlation value detecting means which detects at least one of a horizontal correlation value and a vertical correlation value; and a control means which controls the aperture signal producing means on the basis of the at least one of the horizontal correlation value and the vertical correlation value.

The correlation value detecting means detects a horizontal correlation value Sh and a vertical correlation value Sv on the basis of the signal from the image sensing device, and a mixing ratio of the horizontal aperture signal Hap and the vertical aperture signal Vap is controlled according to the correlation values Sh and Sv. In a case where a vertically striped image is taken by the video camera, for example, since a vertical correlation is stronger than a horizontal correlation (Sv<Sh), and therefore, a coefficient K1 becomes smaller, and accordingly, the vertical aperture signal Vap is decreased. Furthermore, in a case where a horizontally-striped image taken by the video camera, since the horizontal correlation is stronger than the vertical correlation (Sh<Sv), a coefficient K2 becomes smaller, and accordingly, the horizontal aperture signal Hap is decreased. Thus, it is possible to prevent a false aperture signal from being generated.

In accordance with the present invention, since the false aperture signal is prevented from being generated, it is unnecessary to restrict a high-frequency region of the aperture signal, and therefore, it is possible to increase a sharpness of an image even if an image enhancement is performed by the aperture signal.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 3 is an illustrative view showing a method for detecting correlation values;

FIGS. 6(A)–6(F) are timing charts showing digital signals inputted to a selection circuit at an odd field, and a field identification (ID) signal;

FIGS. 7(A)–7(F) are timing charts showing digital signals inputted to the selection circuit at an even field, and a field ID signal;

FIGS. 8(A)–8(E) are illustrative views showing selection of pixels to be processed; and FIGS. 9(A)–9(B) are illustrative views showing a specific pixel and pixels around the specific pixel.

DETAILED DESCRIPTION OF THE PREFERRED EMBODIMENTS

Figure 1:
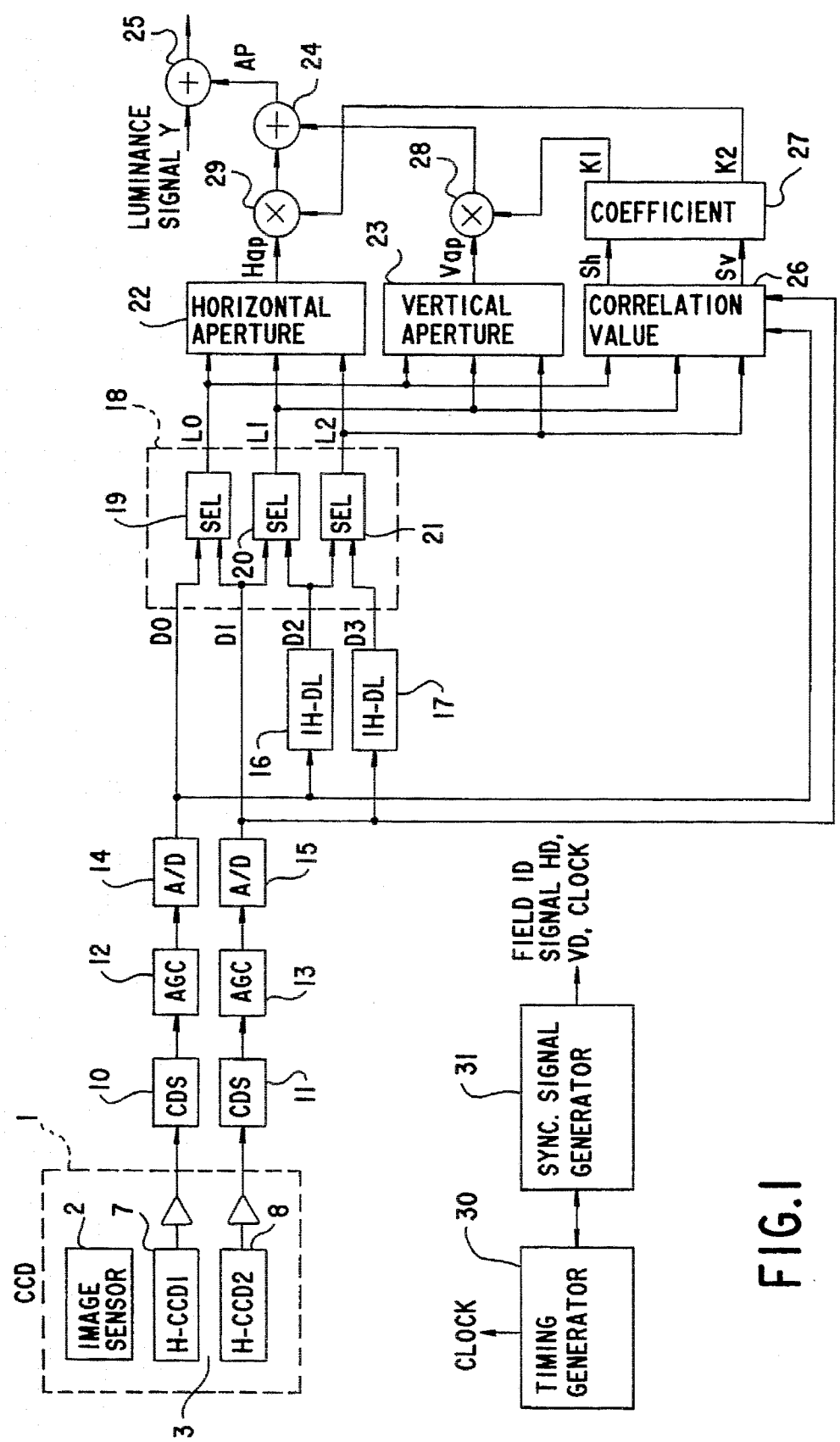
FIG. 1 is a block diagram showing a signal processing circuit for video camera of one embodiment according to the present invention.
Figure 4:
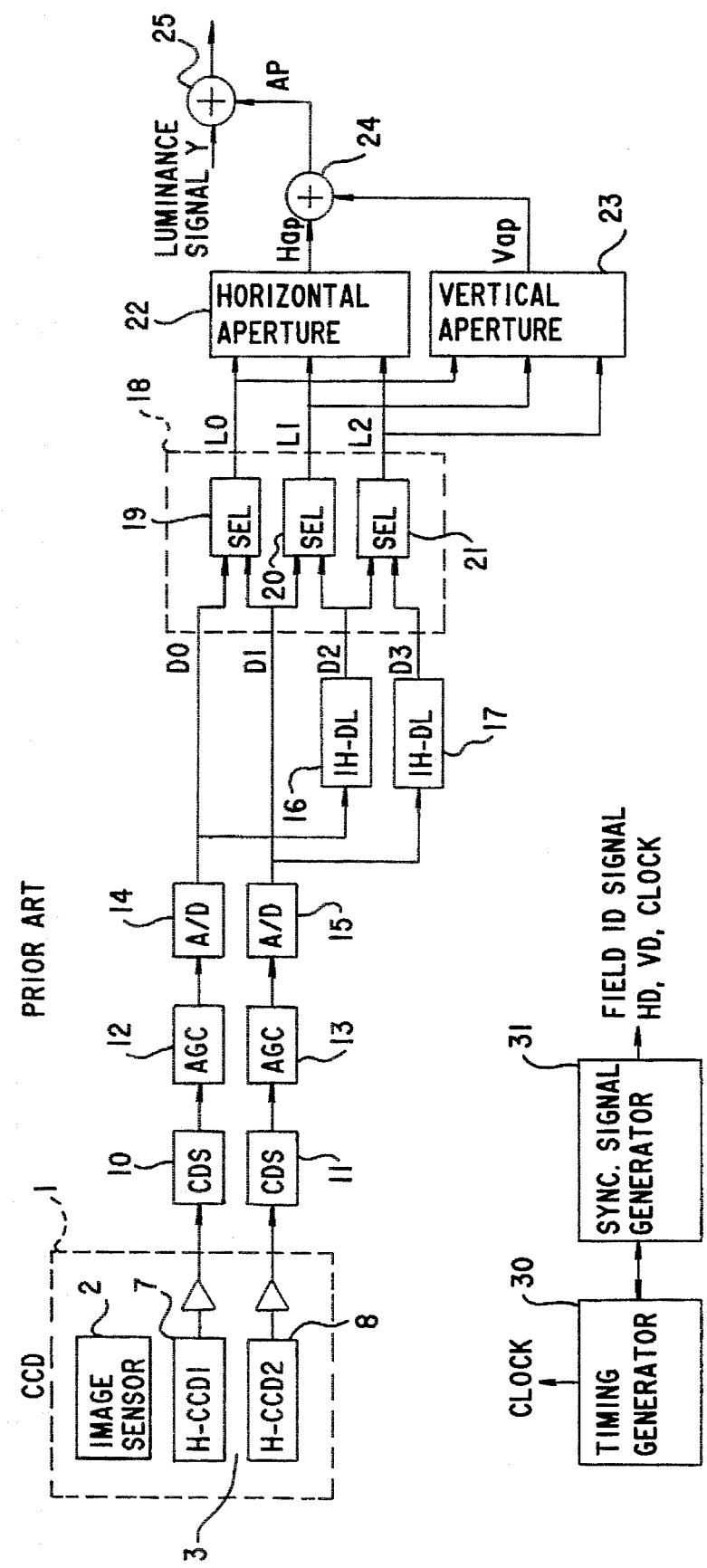
FIG. 4 is a block diagram showing a prior art signal processing circuit for video camera.
Figure 5:
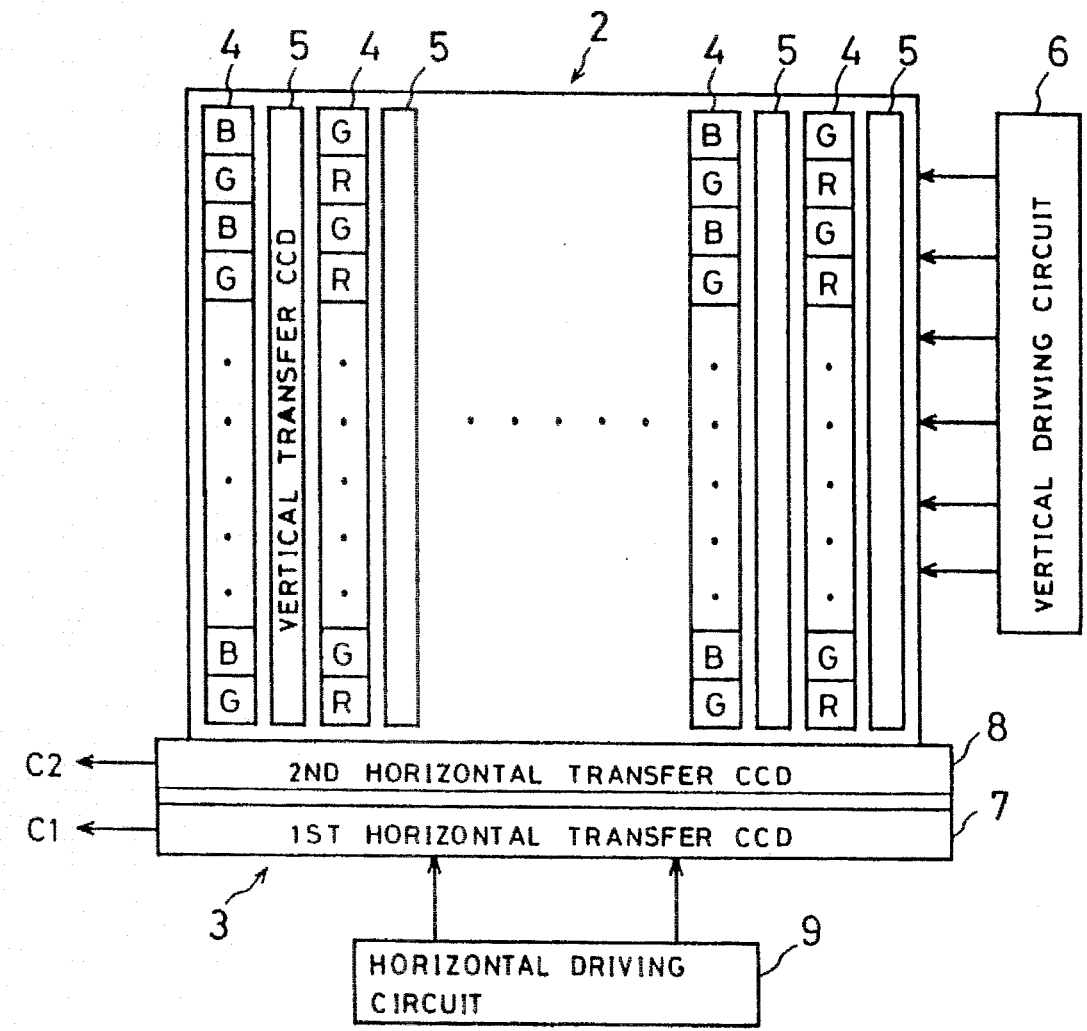
FIG. 5 is an illustrative view showing a solid-state image sensing device.

A signal processing circuit for video camera of one embodiment according to the present invention is shown in FIG. 1 wherein the same reference numerals are applied to the same or similar portions to that of FIG. 4 prior art, and therefore, a description of the same or similar portions will be omitted here.

As shown in FIG. 1, the embodiment is characterized in that there is provided with a correlation value detecting circuit 26 which detects a horizontal correlation value Sh and a vertical correlation value Sv, and a mixing ratio of the horizontal aperture signal Hap and the vertical aperture signal Vap, which are added to each other by the adding circuit 24, is controlled on the basis of the correlation values Sh and Sv.

More specifically, the correlation value detecting circuit 26 detects the horizontal correlation value Sh and the vertical correlation value Sv on the basis of the signals L0, L1 and L2 from the selection circuit 18 and output signals from the A/D converter circuits 14 and 15. Each of the correlation values Sh and Sv has a nature that a value becomes smaller when a correlation is stronger, and the value becomes larger when the correlation is weaker.

Then, in a coefficient calculation circuit 27, coefficients K1 and K2 are evaluated on the basis of the correlation values Sh and Sv. In addition, a relationship that K1+K2=1 is to be satisfied by the coefficients K1 and K2. The coefficients K1 and K2 are calculated according to the following equations (5) and (6).

$$K1=Sv/(Sh+Sv) \tag{5}$$

$$K2=Sv/(Sh+Sv) \tag{6}$$

As shown by the equations (5) and (6), the coefficient K1 becomes larger when the horizontal correlation is stronger than the vertical correlation, that is, the horizontal correlation value Sh is smaller than the vertical correlation value Sv, and the coefficient K2 becomes larger at a time that the vertical correlation is stronger than the horizontal correlation, that is, the vertical correlation value Sv is smaller than the horizontal correlation value Sh.

The coefficients K1 and K2 are respectively supplied to multiplying circuits 28 and 29. The coefficient K1 is multiplied by the vertical aperture signal Vap in the multiplying circuit 28, and the coefficient K2 is multiplied by the horizontal aperture signal Hap in the multiplying circuit 29. Outputs from the multiplying circuits 28 and 29 are added to each other by the adding circuit 24, and then, becomes an aperture signal AP. The aperture signal AP is added to the luminance signal Y by the aperture signal addition circuit 25, and therefore, an image enhancement of the luminance signal Y is performed.

Thus, a mixing ratio of the horizontal aperture signal Hap and the vertical aperture signal Vap is controlled by the coefficients K1 and K2 which are obtained on the basis of the horizontal and vertical correlation values Sh and Sv. Therefore, if the coefficient K1 becomes larger, the vertical aperture signal Vap becomes larger, and the coefficient K2 is relatively smaller, and the horizontal aperture signal Hap becomes smaller.

Therefore, a vertically-striped image is taken by the video camera, the vertical correlation is stronger than the horizontal correlation, that is, Sv<Sh, and therefore, the coefficient K1 becomes smaller, and accordingly, it is possible to prevent a false vertical aperture signal from being generated. Furthermore, if a horizontally-striped image is taken by the video camera, the horizontal correlation is stronger than the vertical correlation, that is, Sh<Sv, and therefore, the coefficient K2 becomes smaller, and accordingly, it is possible to prevent a false horizontal aperture signal from being generated.

Figure 2:
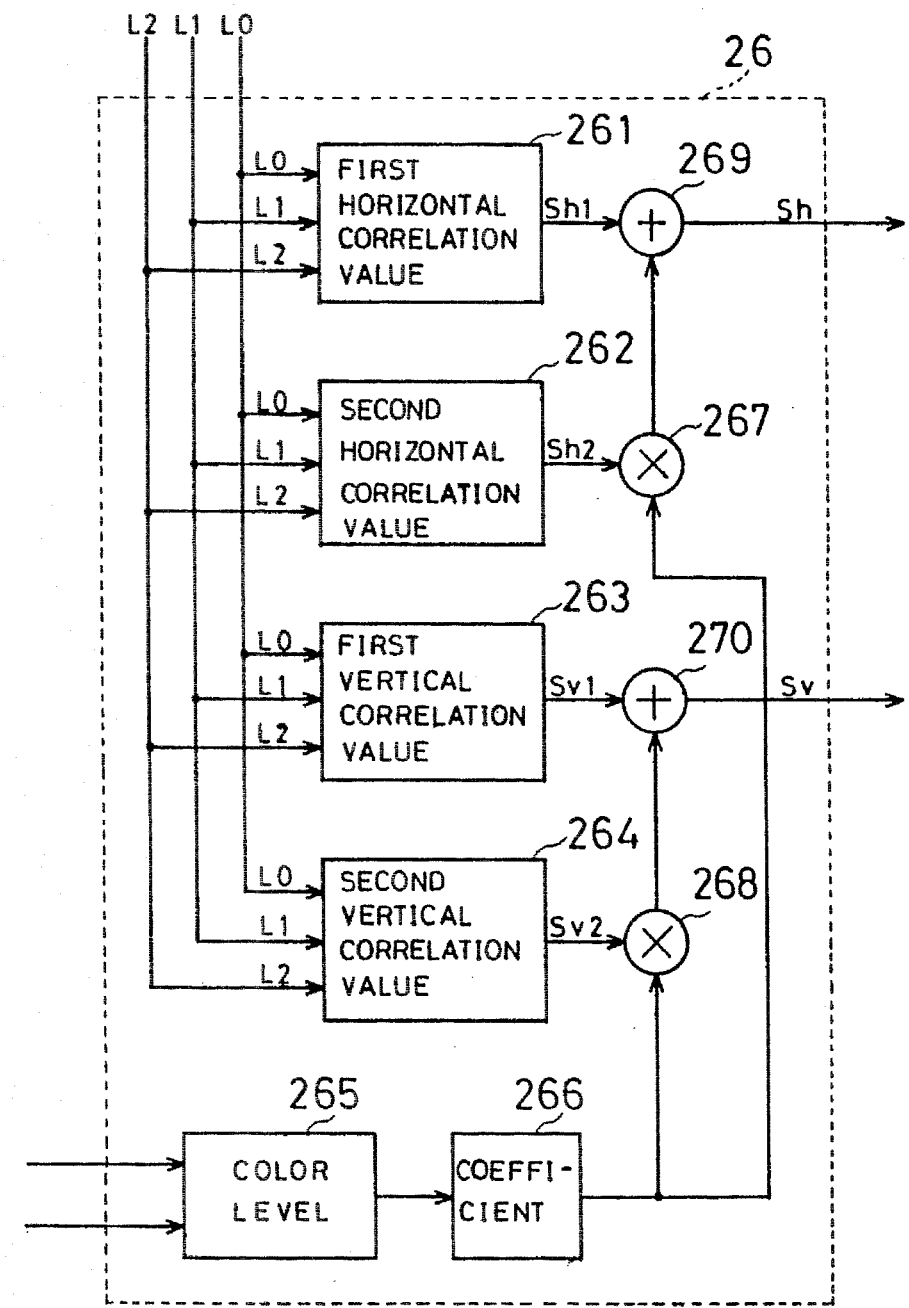
FIG. 2 is a block diagram showing a specific example of a correlation value detecting circuit.

Next, with referring to FIG. 2, a specific example of the correlation value detecting circuit 26 will be described. The correlation value detecting circuit 26 shown in FIG. 2 includes first and second horizontal correlation value detecting circuits 261 and 262, first and second vertical correlation value detecting circuits 263 and 264, a color level detecting circuit 265, a coefficient calculation circuit 266, multipliers 267 and 268 and adders 269 and 270. In addition, respective correlation value detecting circuits are basically constructed by digital filters similar to the aperture signal producing circuits 22 and 23.

A horizontal correlation value Sh1 and a vertical correlation value Sv1 are calculated by the first horizontal correlation value detecting circuit 261 and the first vertical correlation value detecting circuit 263 in accordance with the following equations (7) and (8) and the signals shown in FIG. 9.

$$Sh1=|(G11+G31)/2-(G13+G33)/2| \tag{7}$$

$$Sv1=|(G11+G13)/2-(G31+G33)/2| \tag{8}$$

In the first horizontal correlation value detecting circuit 261 and the first vertical correlation value detecting circuit 263, by utilizing the pixels of the G signals the number of which is the largest within the pixels to be processed, correlation values each representing a degree of a correlation of the specific pixel (center pixel) with respect to adjacent pixels is calculated.

For a correlation value calculation of the odd pixel in the odd field shown in FIG. 9(A), the first vertical correlation value detecting circuit 263 evaluates the vertical correlation value Sv1 by performing a calculation of an absolute value of a difference between signals G12 and G32 of pixels R12 and R32 sandwiching the specific pixel G22 in the vertical direction according to the above described equation (8). Since the pixels R12 and R32 output the R signals, in fact, the signals G12 and G32 do not exist. Therefore, the signal G12 is interpolated by the signals G11 and G13, and the signal G32 is interpolated by the signals G31 and G33.

In the first horizontal correlation value detecting circuit 261, the correlation value Sh1 of the specific pixel G22 with respect to the adjacent pixels in the horizontal direction is calculated according to the above described equation (7). More specifically, the correlation value Sh1 is evaluated by performing a calculation of an absolute value of a difference between signals G21 and G23 of the pixels B21 and B23. However, since the pixels B21 and B23 are B pixels, in fact, the signals G21 and G23 do not exist. Then, the signal G21 is interpolated by the signals G11 and G31, and the signal G23 is interpolated by the signals G13 and G33.

Furthermore, in the correlation value calculation for the even pixel in the odd field shown in FIG. 9(B), the first vertical correlation value detecting circuit 263 outputs an absolute value of a difference between the signals G12 and G32 according to the following equation (9) as the correlation value Sv1 in the vertical direction. Furthermore, the first horizontal correlation value detecting circuit 261 outputs an absolute value of a difference between the signals G21 and G23 according to the following equation (10) as the correlation value Sh1 in the horizontal direction.

$$Sv1=|G12-G32| \quad (9)$$

$$Sh1=|G21-G23| \quad (10)$$

Since the arrangement pattern of the G pixels is the same in the even field, it is possible to calculate the correlation values Sv and Sh by utilizing the above described equations (7)–(10). However, it is necessary to note that the correlation value calculation for the even pixel in the odd field is the same as the correlation value calculation for the odd pixel in the even field, and the correlation value calculation for the odd pixel in the odd field is the same as the correlation value calculation for the even pixel in the even field.

Figure 3:
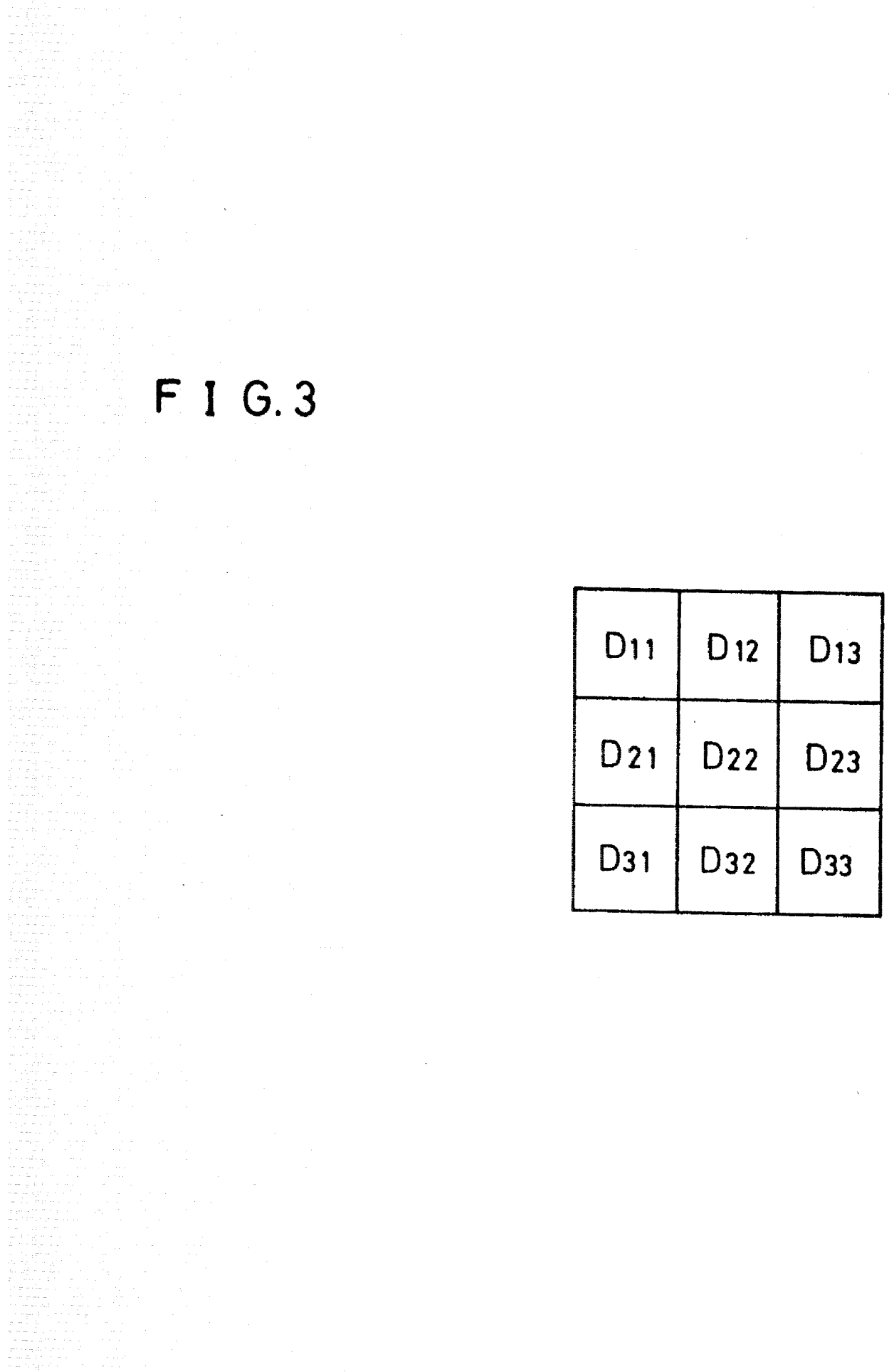

Furthermore, the second horizontal correlation value detecting circuit 262 and the second vertical correlation value detecting circuit 264 calculate correlation values Sh2 and Sv2 on the basis of all the pixels and according to the following equations (11) and (12). More specifically, in order to evaluate the correlation values in the horizontal direction and the vertical direction at a center pixel (a specific pixel) of nine pixels shown in FIG. 3, the second correlation value detecting circuits 262 and 264 use all of the nine pixels including the specific pixel $D_{22}$. In addition, the equations (11) and (12) are not to be changed in spite of the odd field or the even field, and the odd pixel or the even pixel.

$$Sh2=|(D_{11}+2\times D_{21}+D_{31})-(D_{12}+2\times D_{22}+D_{32})|+|(D_{12}+2\times D_{22}+D_{32})-(D_{13}+2\times D_{23}+D_{33})| \quad (11)$$

$$Sv2=|(D_{11}+2\times D_{12}+D_{13})-(D_{21}+2\times D_{22}+D_{23})|+|(D_{21}+2\times D_{22}+D_{23})-(D_{31}+2\times D_{32}+D_{33})| \quad (12)$$

Then, it is possible to use the correlation values Sh1 and Sv1 obtained by the first horizontal correlation value detecting circuit 261 and the first vertical correlation value detecting circuit 263 as they are; however, since the values being interpolated are used in calculating the correlation values Sh1 and Sv1, and therefore, there is a possibility that correct values can not be detected.

On the other hand, the correlation values Sh2 and Sv2 obtained by the second horizontal correlation value detecting circuit 262 and the second vertical correlation value detecting circuit 264 can be calculated without using the values being interpolated, and therefore, at a time of a monochrome image or a color image having a low color level, all the outputs of R, G and B can be regarded as the luminance signal, and accordingly, it is possible to detect the correlation values correctly. However, at a time that the color level is high, if all the signals are regarded as the luminance signal, it is impossible to detect the correlation values Sh2 and Sv2 correctly.

Therefore, in this embodiment shown, in accordance with the color level, a mixing ratio of the horizontal correlation values Sh1 and Sh2 in the adder 269, and a mixing ratio of the vertical correlation values Sv1 and Sv2 in the adder 270 are controlled. That is, the second horizontal correlation value Sh2 and the second vertical correlation value Sv2 are multiplied by coefficients according to the color level by the multipliers 267 and 268, and then, added to the first horizontal correlation value Sh1 and the first vertical correlation value Sv2 by the adders 269 and 270, and therefore, a horizontal correlation value Sh and a vertical correlation value Sv are output from the adders 269 and 270.

Now, the coefficient used in the multipliers 267 and 278 will be described. The digital signals from the A/D converter circuits 14 and 15 are supplied to the color level detecting circuit 265. In the color level detecting circuit 265, color signals are accumulated during one field period for each of blocks which are formed by dividing an image field or screen, and a value totalizing accumulated values of the blocks is output as a color level. The color level is applied to the coefficient calculation circuit 266. The coefficient calculation circuit 266 outputs the coefficient which is in inverse proportion to the input color level. More specifically, at a time of a monochrome image or an image having a low color level, the coefficient being approximately "1" is output, and the coefficient approaches "0" as the color level becomes high. Therefore, the mixing ratio of the horizontal correlation values Sh1 and Sh2 and the mixing ratio of the vertical correlation values Sv1 and Sv2 in the adders 269 and 270 are changed according to the coefficient. That is, when the color level is low, the mixing ratios of the correlation values Sh2 and Sv2 with respect to the correlation values Sh1 and Sv1 becomes large, and when the color level is high, the mixing ratio of the correlation values Sh1 and Sv1 with respect to the correlation values Sh2 and Sv2 becomes large.

By constructing the correlation value detecting circuit 26 in the above described manner, it is possible to detect the correlation values with a proper method irrespective of the color level.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A signal processing circuit for a video camera which comprises a solid-state image sensing device including a large number of pixels arranged in a matrix fashion, and a plurality of kinds of color filters having spectral sensitivity characteristics different from each other arranged in a mosaic fashion, said circuit comprising:

an aperture signal producing circuit which outputs an aperture signal for performing an image enhancement in at least one of a horizontal direction and a vertical direction;

a correlation value detecting means which detects at least one of a horizontal correlation value and a vertical correlation value; and a control means which controls the output of said aperture signal producing circuit on the basis of said at least one of the horizontal correlation value and the vertical correlation value.

2. A signal processing circuit according to claim 1, wherein said aperture signal producing circuit includes a means for calculating the aperture signal on the basis of output signals from pixels each having a specific kind of color filter out of said plurality of kinds of color filters.

3. A signal processing circuit according to claim 2, wherein said control means includes a) a coefficient calculation means which calculates a first coefficient on the basis of said at least one of the horizontal correlation value and the vertical correlation value, and b) a multiplying means which multiplies said aperture signal by said first coefficient.

4. A signal processing circuit according to claim 3, wherein said correlation value detecting means includes at least one of a horizontal correlation value detecting means which outputs the horizontal correlation value and a vertical correlation value detecting means which outputs the vertical correlation value.

5. A signal processing circuit according to claim 4, wherein said horizontal correlation value detecting means includes a first horizontal correlation value detecting circuit which detects a first horizontal correlation value on the basis of a specific color component, a second horizontal correlation value detecting circuit which detects a second horizontal correlation value on the basis of all color components, and a mixing means which mixes the first horizontal correlation value and the second horizontal correlation value with a first mixing ratio.

6. A signal processing circuit according to claim 5, wherein said horizontal correlation value detecting means includes a color level detecting means which detects a color level by which said first mixing ratio of the first horizontal correlation value and the second horizontal correlation value is changed.

7. A signal processing circuit according to any one of claims 4 and 5, wherein said vertical correlation value detecting means includes a first vertical correlation value detecting circuit which detects a first vertical correlation value on the basis of a specific color component, a second vertical correlation value detecting circuit which detects a second horizontal correlation value on the basis of all color components, and a mixing means which mixes the first vertical correlation value and the second vertical correlation value with a second mixing ratio.

8. A signal processing circuit according to claim 7, wherein said vertical correlation value detecting means includes a color level detecting means which detects a color level by which said second mixing ratio of the first vertical correlation value and the second vertical correlation value is changed.

* * * * *